United States Patent
Gaynes et al.

(10) Patent No.: US 10,168,436 B2
(45) Date of Patent: Jan. 1, 2019

(54) WATER SOLUBLE LOW ALPHA PARTICLE EMISSION ELECTRICALLY-CONDUCTIVE COATING

(71) Applicant: International Business Machines Corporation, Armonk, NY (US)

(72) Inventors: Michael A. Gaynes, Vestal, NY (US); Jeffrey D. Gelorme, Burlington, CT (US); Michael S. Gordon, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 15/151,137

(22) Filed: May 10, 2016

(65) Prior Publication Data
US 2017/0329020 A1 Nov. 16, 2017

(51) Int. Cl.
*G01T 1/00* (2006.01)
*G01T 3/00* (2006.01)
*G01T 1/185* (2006.01)
*H01B 1/24* (2006.01)
*C09D 5/24* (2006.01)
*C09D 139/06* (2006.01)
(Continued)

(52) U.S. Cl.
CPC ............ *G01T 1/185* (2013.01); *C09D 5/24* (2013.01); *C09D 7/65* (2018.01); *C09D 139/06* (2013.01); *G01T 3/00* (2013.01); *H01B 1/24* (2013.01); *C08K 3/04* (2013.01)

(58) Field of Classification Search
CPC ..... H01B 1/00; H01B 1/14; H01B 1/16; H01B 1/18; B05D 5/12; G01T 3/00; G01T 3/08; C09D 5/24
See application file for complete search history.

(56) References Cited

U.S. PATENT DOCUMENTS 4,328,151 A 5/1982 Robinson
4,761,335 A * 8/1988 Aurichio ............... C09J 7/0282
174/256
(Continued)

OTHER PUBLICATIONS

Escaig, "Binding metals to polymers. A short review of basic physical mechanisms," Journal de Physique IV, Jan. 1993, 03 (C7), pp. C7-753-C7-761.
(Continued)

*Primary Examiner* — Mark Kopec
(74) *Attorney, Agent, or Firm* — Vazken Alexanian; Michael J. Chang, LLC

(57) ABSTRACT

Water soluble, low alpha particle emission, electrically conductive coatings and techniques for formation thereof are provided. In one aspect, a method for forming an electrically-conductive coating on a substrate includes the steps of: forming an aqueous solution of a water soluble polymer (e.g., a polyvinylpyrrolidinone polymer or copolymer); adding electrically conductive filler particles to the aqueous solution above a percolation threshold to form a mixture; and depositing the mixture onto the substrate to form a low alpha particle emitting, electrically-conductive coating on the substrate, wherein the coating blocks alpha particles from being emitted from the substrate. An article and an alpha particle detector having a surface(s) thereof covered with the coating are also provided.

17 Claims, 2 Drawing Sheets

(51) Int. Cl.
*C09D 7/65* (2018.01)
*C08K 3/04* (2006.01)

(56) References Cited

U.S. PATENT DOCUMENTS

| | | | | |
|---|---|---|---|---|
| 4,810,600 | A | * 3/1989 | Periard | H01M 2/0272 |
| | | | | 252/182.1 |
| 5,385,785 | A | 1/1995 | Lovell | |
| 5,908,898 | A | 6/1999 | Wan-Cheng et al. | |
| 5,928,571 | A | 7/1999 | Chan | |
| 6,136,396 | A | 10/2000 | Gilmer | |
| 6,440,331 | B1 | 8/2002 | Carano et al. | |
| 8,815,725 | B2 | 8/2014 | Gaynes et al. | |
| 2005/0098437 | A1 | 5/2005 | Shiepe | |
| 2010/0224836 | A1* | 9/2010 | Kitamura | C08B 1/003 |
| | | | | 252/511 |
| 2015/0053668 | A1* | 2/2015 | Decker | H05B 3/145 |
| | | | | 219/553 |

OTHER PUBLICATIONS

J.D. Wilkinson et al., "Multicenter comparison of alpha particle measurements and methods typical of semiconductor processing," IEEE International Reliability Physics Symposium (IRPS), Apr. 2011, 5B.3, 10 pages.

M.S. Gordon et al., "Selected topics in ultra-low emissivity alpha-particle detection," IEEE Transactions on Nuclear Science, vol. 60, No. 6, Dec. 2013, pp. 4265-4274.

G. Carotenuto et al., "Preparation and characterization of transparent/conductive nano-composites films," Journal of Materials Science, vol. 41, No. 17, Jun. 2006, pp. 5587-5592.

Q. Wang et al., "Carbon Nanotube-Based Thin Films: Synthesis and Properties," in "Carbon Nanotubes—Synthesis, Characterization, Applications," Dr. Siva Yellampalli (Ed.), INTECH Open Access Publisher, Jul. 2011, pp. 487-514.

* cited by examiner

WATER SOLUBLE LOW ALPHA PARTICLE EMISSION ELECTRICALLY-CONDUCTIVE COATING

FIELD OF THE INVENTION

The present invention relates to reducing alpha particle emissions, and more particularly, to water soluble, low alpha particle emission, electrically conductive coatings and techniques for formation thereof.

BACKGROUND OF THE INVENTION

In computer technology, alpha particle emissions can lead to errors in semiconductor chips. Therefore, the use of radioactive elements in chip packaging has to be monitored.

Alpha particle emission, such as from chip packaging material, can be measured using radiation detectors. See, for example, U.S. Pat. No. 8,815,725 issued to Gaynes et al., entitled "Low Alpha Particle Emission Electrically-Conductive Coating" (hereinafter "U.S. Pat. No. 8,815,725"). However, since the amount of alpha particle emissions being detected are so low, getting accurate measurements can be challenging. For instance, in some radiation detectors, the detector cannot distinguish the alpha particles emitted from the tray (on which a sample is placed) from those being emitted from the sample itself.

As provided in U.S. Pat. No. 8,815,725, a low alpha particle emitting/electrically-conductive coating can be used to coat the tray, thereby reducing its contribution to background alpha particle emission in the detector. The coatings described in U.S. Pat. No. 8,815,725 are derived from organic solvent based materials such as epoxy resins filled with or containing substantial amounts of conductive filler, such as carbon black or graphite particles. The use of organic solvent based coatings can, however, be undesirable due to a host of environmental concerns.

Therefore, alternative low alpha particle emitting, electrically-conductive coatings would be desirable.

SUMMARY OF THE INVENTION

The present invention provides water soluble, low alpha particle emission, electrically conductive coatings and techniques for formation thereof. In one aspect of the invention, a method for forming an electrically-conductive coating on a substrate is provided. The method includes the steps of: forming an aqueous solution of a water soluble polymer; adding electrically conductive filler particles to the aqueous solution above a percolation threshold to form a mixture; and depositing the mixture onto the substrate to form a low alpha particle emitting, electrically-conductive coating on the substrate, wherein the coating blocks alpha particles from being emitted from the substrate.

In another aspect of the invention, an article is provided which includes: a substrate; and a low alpha particle emitting, electrically-conductive coating on a surface of the substrate, wherein the low alpha particle emitting, electrically-conductive coating includes a polymer (e.g., a polyvinylpyrrolidinone polymer or copolymer such as polyvinyl acetate-polyvinylpyrrolidone) and electrically conductive filler particles (e.g., graphite powder). For example, the structure can be an alpha particle detector having a first electrode, a second electrode, and a sample tray on the first electrode, and the water soluble, low alpha particle emission, electrically-conductive coating can be present on at least one surface of the sample tray.

In yet another aspect of the invention, an alpha particle detector is provided. The alpha particle detector includes a first electrode; a second electrode; a sample tray on the first electrode; and a low alpha particle emitting, electrically-conductive coating on a surface of the sample tray, wherein the low alpha particle emitting, electrically-conductive coating includes a polymer and electrically conductive filler particles.

A more complete understanding of the present invention, as well as further features and advantages of the present invention, will be obtained by reference to the following detailed description and drawings.

DETAILED DESCRIPTION OF PREFERRED EMBODIMENTS

Provided herein are low alpha particle emission electrically-conductive coatings wherein the coating base consists entirely of 100% water soluble polymers/resins. As highlighted above, use of organic solvent soluble polymers involves potential environmental safety issues such as green house emissions, toxicity, pollution, etc. Advantageously, these concerns are avoided through use of the present water soluble formulations. The term "low alpha particle emission," as used herein, refers to an alpha particle emission that is less than 1 alpha particle per khr-cm$^2$, whereas the term "moderate alpha particle emission," as used herein, refers to an alpha particle emission that is from about 2 alpha particle per khr-cm$^2$ to about 50 alpha particle per khr-cm$^2$, and ranges therebetween, and the term "high alpha particle emission," as used herein, refers to an alpha particle emission that is greater than about 50 alpha particle per khr-cm$^2$. The term "electrically-conductive," as used herein, refers to an electrical conductivity of greater than about $1\times10^4$ siemens per centimeter (S/cm) at 20° C.

As will be described in detail below, the present techniques employ water soluble polymers such as polyvinylpyrrolidinone polymers:

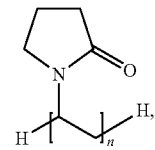

and copolymers, such as polyvinyl acetate-polyvinylpyrrolidone:

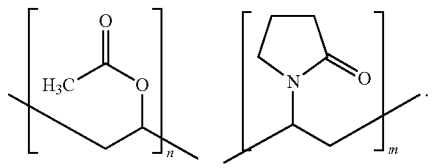

In order to make the coating electrically conductive, an electrically conductive filler particle having a low alpha particle emissivity is added to an aqueous solution of the polymer. As will be described in detail below, suitable electrically conductive filler particles include, but are not limited, to graphite powder. The resulting coating can then be applied to a given substrate (e.g., detector tray—see above) to prevent alpha particles from being emitted from the substrate.

Figure 1:
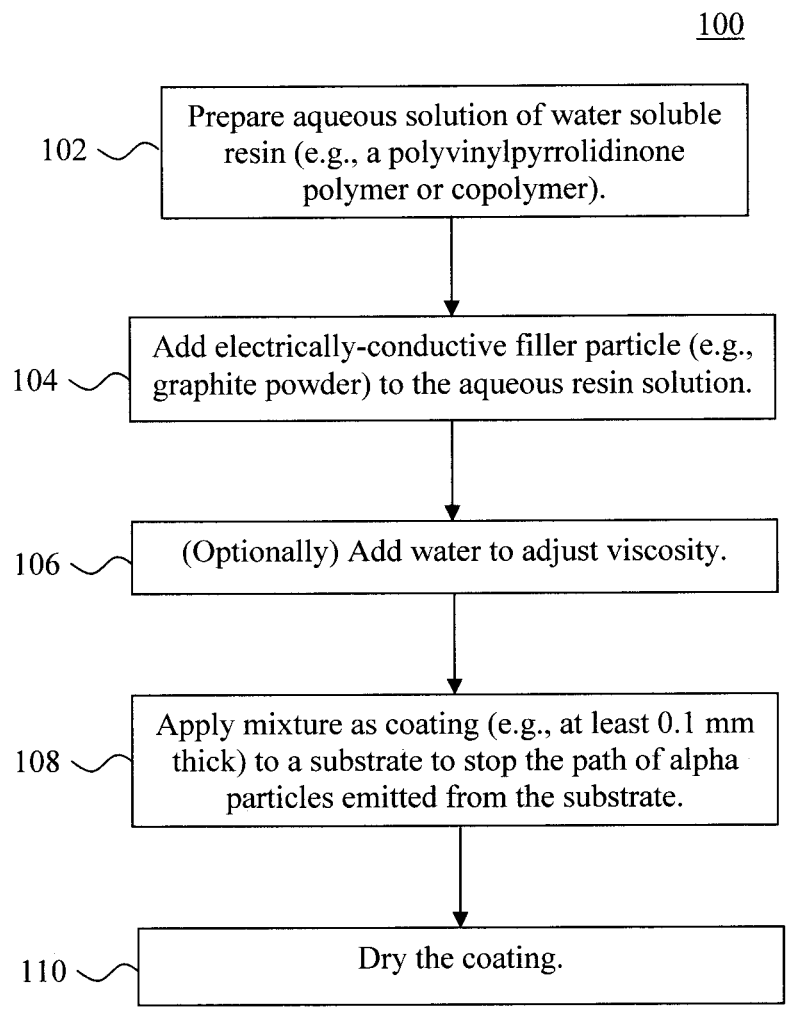
FIG. 1 is a diagram illustrating an exemplary methodology for forming a water soluble, low alpha particle emission, electrically-conductive coating on a substrate according to an embodiment of the present invention.
Figure 2:
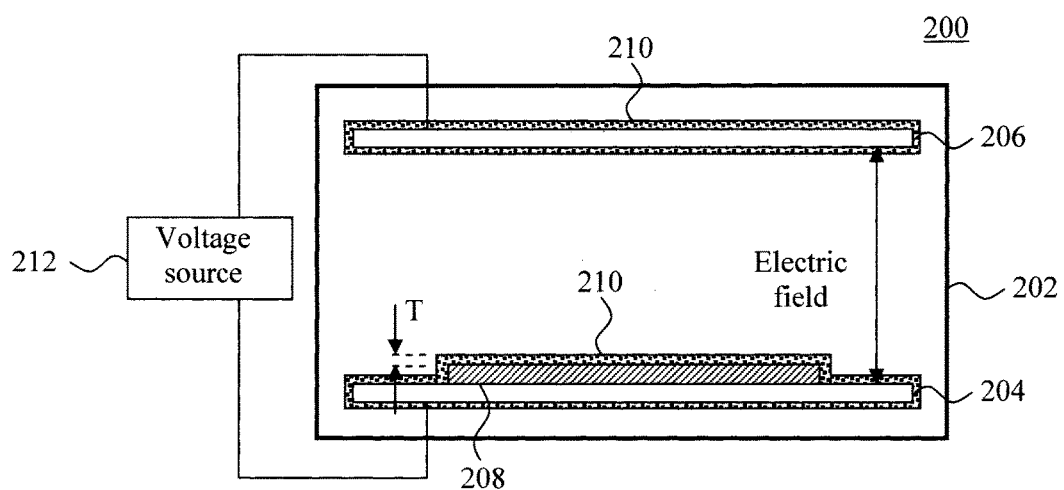
FIG. 2 is a diagram illustrating an exemplary alpha particle detector using the present water soluble, low alpha particle emission, electrically-conductive coating according to an embodiment of the present invention.

The present techniques are now described in detail by way of reference to FIGS. 1 and 2. FIG. 1 illustrates exemplary methodology 100 for forming a water soluble, low alpha particle emission, electrically-conductive coating on a substrate. In step 102, an aqueous solution of water soluble polymer is prepared. As provided above, according to an exemplary embodiment, the water soluble polymer includes a polyvinylpyrrolidinone homopolymer or copolymer. By way of example only, suitable polyvinylpyrrolidinone copolymers include, but are not limited to, polyvinyl acetate-polyvinylpyrrolidone. The polyvinylpyrrolidinone polymer or copolymers used herein may be obtained commercially from, e.g., Sigma-Aldrich, St. Louis, Mo.

The selection of the polymer can depend on the end use of the coating. For instance, for applications where the coating needs to be tough and ductile, and therefore resistant to cracking, a polyvinyl acetate-polyvinylpyrrolidone copolymer is preferred, as polyvinylpyrrolidinone homopolymers tend to be somewhat brittle. According to an exemplary embodiment, a polyvinyl acetate-polyvinylpyrrolidone copolymer with a mole ratio of polyvinyl acetate:polyvinylpyrrolidone of 1:1.3—which has a glass transition temperature ($T_g$) of about 64 degrees Celsius (° C.) is used.

According to an exemplary embodiment, step 102 is performed by dissolving from about 25% by weight to about 35% by weight, and ranges therebetween, e.g., about 30% by weight, of the polymer in water. The amount of water soluble polymer and water used can be adjusted depending on the size of the article being coated. Stirring is used to ensure complete dissolution. To use a simple example, if 100 grams total of a coating solution is required, then 30 grams of polyvinylpyrrolidinone polymer can be added to 70 grams of water, and stirred magnetically until dissolution is complete—about 2 hours.

Once the polymer has completely dissolved, in step 104 electrically conductive filler particles are added to the aqueous polymer solution. The electrically conductive filler particles used need to have a low alpha particle emissivity. By way of example only, suitable electrically conductive filler particles with low alpha particle emissivity include, but are not limited to, graphite powder. According to an exemplary embodiment, the graphite powder used has a particle size of from about 2 micrometers (μm) to about 40 μm, and ranges therebetween, e.g., from about 2 μm to about 20 μm, and ranges therebetween.

The present coatings can be used to coat components of a radiation detector, such as the sample tray. As will be described in detail below, radiation detectors can have a gas-filled ionization chamber which includes two electrodes (e.g., an anode and a cathode) to which a voltage potential is applied to create an electric field in the gas. When exposed to ionizing radiation, ion-pairs are created and move in response to the electric field. The electrons, caused by the ionization, drift towards the anode. This ionization current is measured by the detector. The requirement that the present coatings be electrically conductive stems from the fact that non-conductors can be charged to a high voltage by coming in contact with other materials. This built up charge can distort the electric field in an ionization detector resulting in a lower reading for the alpha particle emission of the sample.

To convey electrical conductivity to the coating, the filler particles are added to the aqueous polymer solution above a percolation threshold. As is known in the art, electrically-conductive particles can be used to increase the conductivity of a polymer. See, for example, U.S. Pat. No. 5,908,898 issued to Wan-cheng et al., entitled "Intrinsically Conductive Polymer Blends Having a Low Percolation Threshold" (hereinafter "U.S. Pat. No. 5,908,898"), the contents of which are incorporated by reference as if fully set forth herein. As described in U.S. Pat. No. 5,908,898, high loading levels of the particulates are often needed to provide electrically conductive pathways through the polymer matrix (a process known as percolation). Conductive pathways form when the amount of particles added to the polymer reach or exceed a percolation threshold. The percolation threshold is associated with a point of steepest rise in a plot of the logarithm of conductivity against a percentage of loading volume of the conductive material.

According to an exemplary embodiment, the electrically conductive filler particles are added to the aqueous polymer solution in a ratio (of filler particles to polymer) of from about 0.2:100 to about 47:53 (depending on the particle shape), and ranges therebetween. Thus, for example, if 53 grams of polyvinylpyrrolidinone is used, then 47 grams of spherical graphite powder would also be added to the solution in step 104 if a 47:53 ratio of graphite powder-to-polymer is desired. Similarly, if a 0.2-to-100 ratio of graphite powder to polymer is desired is desired, then 0.2 grams of graphite flake powder with an aspect ratio of 10:1 would be added to a solution containing 99 grams of polyvinylpyrrolidinone.

Further, the polymer and electrically conductive filler particles can be chosen such that there is a chemical attraction between the polymer and electrically conductive filler particles which promotes a homogenous particle filler suspension that is resistant to filler settling. For instance, the above-referenced polyvinylpyrrolidinone homopolymers and polyvinyl acetate-polyvinylpyrrolidone copolymers are basic (have a pH greater than 7), whereas the above-referenced graphite powder is acidic (has a pH less than 7). Thus, in the resulting mixture, there is a chemical attraction between the basic polymer and the acidic filler particle. This chemical attraction will help keep the filler particles in suspension rather than settling over time.

Once the electrically-conductive filler particles are mixed into the solution, the overall viscosity of the mixture can be adjusted if necessary by adding more water to the solution. See step 106. The viscosity needed is based on the coating technique used to apply the coating to a given substrate (see description of step 108, below). For instance, the mixture as prepared may have a viscosity of from about 11 Pascal-seconds (Pa·s) to about 20 Pa·s, and ranges therebetween, at 25° C. which may be suitable as a higher viscosity mixture for a knife-coating or pour coating method, whereas a lower viscosity mixture (e.g., from about 0.005 Pa·s to about 0.5 Pa·s, and ranges therebetween, at 25° C.) would be needed for spraying. Properly adjusting the viscosity of the mixture (by adding water) to attain a desired viscosity for a particular application would be within the capabilities of one skilled in the art.

In step 108, the low alpha particle emission electrically-conductive mixture is applied as a coating on a substrate. As provided above, this coating will block alpha particles from the substrate. An example of the present mixture being used to coat the surfaces of a radiation detector is provided below.

However, the present techniques may be employed in accordance with any application where the suppression of alpha particle emissivity is desired. For instance, the present techniques may be employed to form a coating on a semiconductor device. By way of example only, the present low alpha particle emission electrically-conductive mixture can be deposited onto a substrate using spraying, dipping, painting, pouring, knife coating, water (slot or slit coating), curtain coating, brushing or rolling.

The range of alpha particles is generally less than 0.1 millimeter (mm). Therefore, any of the present coating thicker than that will block the alpha particles from emerging from under the coating. Thus, according to an exemplary embodiment, the coating is formed in step 108 having a thickness that is greater than or equal to about 0.1 mm, e.g., from about 0.1 mm to about 0.5 mm, and ranges therebetween.

Following application of the mixture to form a coating on the substrate, the coating can be dried to form a hard coating on the substrate. See step 110. For instance, the drying can be carried out in air at room temperature or, to accelerate the drying process, heating the coating to a temperature of from about 20° C. to about 60° C., and ranges therebetween, will facilitate evaporating the water from the mixture, leaving behind a hard, solid coating on the substrate.

As provided above, one exemplary application of the present water soluble, low alpha particle emission, electrically-conductive coatings is in alpha particle detectors. For instance, the present coatings can be applied to a sample tray in an alpha particle detector to block alpha particles emitted from the tray and thereby prevents the tray material from contributing to the readings taken from the sample. Advantageously, this permits materials of moderate or even high alpha particle emission to be used in particle detectors, provided they were coated with the present low emission coating. Accordingly, this widens the scope of suitable (and potentially more-common, less expensive) materials to be used in the detectors.

FIG. 2 is a diagram illustrating an exemplary alpha particle detector 200. As shown in FIG. 2, alpha particle detector 200 includes a gas-filled ionization chamber 202 encasing a first electrode 204 and a second electrode 206. The first and second electrodes 204 and 206 may also be referred to herein as an anode and a cathode (or vice versa).

A sample tray 208 is present on one of the electrodes (in this case on first electrode 204). As provided above, in most cases the detector cannot distinguish the alpha particle emission from a sample that is smaller than that of the tray, from the tray. Thus, the idea here is to make the tray 208 have as low of a background of alpha particles as low as possible. To do so, a coating 210 of the present water soluble, low alpha particle emission, electrically-conductive material (prepared as according to methodology 100 of FIG. 1—see above), is applied to a surface(s) of the sample tray 208. The coating 210 will block alpha particles from being emitted from the tray 208 and into the detector's active volume.

Suitable techniques for applying the coating 210 to the tray 208 include, but are not limited to, spraying, dipping, painting, pouring, knife coating, water (slot or slit coating), curtain coating, brushing and rolling. See above. As also provided above, in order to block alpha particles from being emitted from the tray 208, it is preferable for the coating 210 to have thickness T that is greater than or equal to about 0.1 mm, e.g., from about 0.1 mm to about 0.5 mm, and ranges therebetween. See FIG. 2.

According to an exemplary embodiment, the tray 208 can be formed from an electrically conductive material, such as a metal. In that case, the tray 208 itself can serve as one of the electrodes (e.g., replacing first electrode 204). A metal surface (such as a metal tray) will have a native oxide present. Metal oxides facilitate polymer bonding to a surface. See, for example, Escaig, "Binding metals to polymers. A short review of basic physical mechanisms," Journal de Physique IV, 1993, 03 (C7), pp. C7-753-C7-761, the contents of which are incorporated by reference as if fully set forth herein. Advantageously however, since the present coating is electrically-conductive it is not necessary to use a metal substrate since the coating 210 itself can serve as an electrode/conductor. Thus, according to an exemplary embodiment, the substrate (tray 208) is formed from an electrically insulating material, such as plastic, glass, etc., and is coated with the (electrically-conductive) coating 210. The electrical connection from the voltage source (as shown in FIG. 2) would then be made directly to the (electrically-conductive) coating 210. In the same manner, the present (electrically-conductive) coating 210 can be used to coat other surfaces of the alpha particle detector 200, such as first and second electrodes 204 and 206.

During operation, a voltage source 212 is used to apply a voltage potential to the electrodes 204 and 206, which creates an electric field in the gas within the ionization chamber 202. When exposed to ionizing radiation, ion-pairs are created and moved (by the electric field) to the respective (anode and cathode) electrodes 204 and 206. This ionization current is measured by the detector. Since the coating 210 is electrically-conductive, static charge build-up within the coating (which can affect the detector readings) is avoided.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for forming an alpha particle detector comprising an electrically-conductive coating on a substrate, the method comprising the steps of:
    forming an aqueous solution of a water soluble polymer;
    adding electrically conductive filler particles consisting of graphite powder to the aqueous solution above a percolation threshold to form a mixture, wherein the graphite powder has a particle size of from 2 micrometers to about 40 micrometers, and ranges therebetween; and
    depositing the mixture onto the substrate to form a low alpha particle emitting, electrically-conductive coating on the substrate, wherein the low alpha particle emitting, electrically-conductive coating blocks alpha particles from being emitted from the substrate.

2. The method of claim 1, wherein the low alpha particle emitting, electrically-conductive coating has an alpha particle emission of less than 1 alpha particle per khr-cm$^2$.

3. The method of claim 1, wherein the water soluble polymer is selected from the group consisting of: a polyvinylpyrrolidinone homopolymer, a polyvinylpyrrolidinone copolymer, and combinations thereof.

4. The method of claim 3, wherein the polyvinylpyrrolidinone copolymer is polyvinyl acetate-polyvinylpyrrolidone.

5. The method of claim 1, wherein the aqueous solution of the water soluble polymer is formed by dissolving from about 25% by weight to about 35% by weight of the water soluble polymer in water.

6. The method of claim 1, wherein a ratio of the electrically conductive filler particles to the water soluble polymer in the aqueous solution is from about 0.2:100 to about 47:53, and ranges therebetween.

7. The method of claim 1, further comprising the step of: adjusting a viscosity of the mixture to from about 11 Pa·s to about 20 Pa·s, and ranges therebetween using water.

8. The method of claim 1, further comprising the step of: adjusting a viscosity of the mixture to from about 0.005 Pa·s to about 0.5 Pa·s, and ranges therebetween using water.

9. The method of claim 1, wherein the mixture is deposited onto the substrate using spraying, dipping, painting, pouring, knife coating, slot coating, slit coating, brushing, curtain coating, or rolling.

10. The method of claim 1, wherein the low alpha particle emitting, electrically-conductive coating has a thickness that is greater than or equal to about 0.1 mm.

11. The method of claim 10, wherein the thickness of the low alpha particle emitting, electrically-conductive coating is from about 0.1 mm to about 0.5 mm, and ranges therebetween.

12. An alpha particle detector, comprising:
a first electrode;
a second electrode;
a sample tray on the first electrode; and
a low alpha particle emitting, electrically-conductive coating on a surface of at least one of the first electrode, the second electrode, and the sample tray, wherein the low alpha particle emitting, electrically-conductive coating comprises a water soluble polymer and electrically conductive filler particles.

13. The alpha particle detector of claim 12, wherein the low alpha particle emitting, electrically-conductive coating has an alpha particle emission of less than 1 alpha particle per khr-cm$^2$.

14. The alpha particle detector of claim 13, wherein the polymer is selected from the group consisting of: a polyvinylpyrrolidinone homopolymer, a polyvinylpyrrolidinone copolymer, and combinations thereof.

15. The alpha particle detector of claim 14, wherein the polyvinylpyrrolidinone copolymer is polyvinyl acetate-polyvinylpyrrolidone.

16. The alpha particle detector of claim 12, wherein the electrically conductive filler particles comprise graphite powder.

17. The alpha particle detector of claim 12, wherein the low alpha particle emitting, electrically-conductive coating has a thickness that is greater than or equal to about 0.1 mm.

\* \* \* \* \*